United States Patent Office 3,119,447
Patented Jan. 28, 1964

3,119,447
TREATMENT OF FLOOD WATERS
Philip J. Raifsnider, Richmond, Calif., and Lavigne K. Gatzke, Denver, Colo., assignors to Shell Oil Company, New York, N.Y., a corporation of Delaware
No Drawing. Filed July 27, 1960, Ser. No. 45,529
10 Claims. (Cl. 166—1)

This invention relates to a method of corrosion-inhibition of a ferruginous material, e.g., steel, and more particularly pertains to the treatment of flood waters to prevent corrosion, and, specifically, pitting of piping systems used in water-flood operations, including pipes employed for the delivery and injection of flood waters to and into subterranean formations, and/or those used for the recovery of said waters and of hydrocarbons, whether liquid, or gaseous, or both, therefrom, which technique is used to increase rate of oil production and ultimate oil recovery in secondary recovery operations. This application is a continuation-in-part of our patent application, Serial No. 829,207, filed July 24, 1959, now abandoned.

It is generally accepted that only about 35% of the total amount of oil in a given petroleum formation reservoir may be economically recovered by primary recovery means. Even though somewhat greater amounts may be obtained by following improved primary recovery practices, e.g., repressuring, etc., it is equally well known that substantial quantities of oil still remain in the oil reservoirs even after these economically practical primary recovery methods have been exhausted.

For this reason there is a great deal of interest in what are known as "secondary recovery" methods, which may be defined as including or comprising techniques which augment the remaining reservoir energy after depletion thereof by primary recovery methods. One such method involves the injection of water under pressure at various points into a partially depleted oil-bearing reservoir rock formation to displace portions of the residual oil therein toward a producing well. The oil which is recovered from the producing well, e.g., by pumping, is then separated from the water which has been pumped from the producing well, this water being conveyed to a storage reservoir from which it can again be pumped into the injection well or wells. Supplementary water from other sources may also be used in conjunction with the produced water. When the storage reservoir is open to the atmosphere and the water is subject to aeration, this type of water flooding system is referred to as an open water flooding system, as contrasted from a closed water flooding system in which the water is recirculated in a closed system without substantial aeration. This last-mentioned system thus generally operates under anaerobic conditions.

Two general types of water are employed for secondary oil recovery. Probably the most widely used type is fresh ground water obtained from rivers, lakes, wells, etc. In some regions of the country, however, brine waters from producing oil wells are used because of the limited supply of fresh ground water, as well as due to the large requirements of water in repressuring operations. In some areas, it has been found convenient to use a mixture of brine waters and fresh ground waters.

The use of either fresh waters or brine waters has been found to create a serious corrosion problem in that both types of waters contain dissolved materials which attack the metal pipes through which the water is injected into the oil sands, as well as the metal pipes used on the surface for transporting said waters to and from the aforementioned water storage reservoirs. Most of the corrosion is produced by dissolved material having either basic or acidic properties. For example, the waters may contain carbonate ions, bicarbonate ions, and the like, the presence of which in water tends to seriously corrode the pipes through which these waters are circulated. Generally, such waters are only slightly acidic, i.e., have a pH of below 7, but generally above 6.

There is a further corrosion problem caused by the presence of dissolved oxygen in the water. Thus, as will be brought out below, the presence of even very small, even minute, amounts of dissolved oxygen in the waters used in water flood operations cause corrosion of metal pipes used in water flooding operations, this corrosion being particularly exemplified by pitting. This pitting occurs even in closed water flooding systems, i.e., those which operate under anaerobic conditions because even under such operating conditions the flooding waters have small concentrations of oxygen dissolved therein, these concentrations being nevertheless sufficient to cause the above pitting-type of pipe surface corrosion. Even with only trace concentrations of oxygen, e.g., 0.1 p.p.m. or even less, which may be present in flood waters used in flooding operations effected under anaerobic conditions, the large volumes of such water moving through the pipes make significant amounts of oxygen available to large cathodic areas surrounding very small anodic spots, thus causing considerable pitting corrosion.

It was discovered that basic organic nitrogen compounds having at least one aliphatic group of at least six carbon atoms in chain length inhibit the aforementioned corrosion of ferruginous members, e.g., steel pipes, used in water flooding operations. It was also found that, even when the water flooding operations are effected in closed systems and under anaerobic conditions, the concentrations of these nitrogen compounds necessary to effect corrosion inhibition (including the aforementioned pitting of the pipe surfaces) are such as to render the use of these organic nitrogen-containing corrosion inhibitors tially impossible at least from an economic standpoint. For example, in one water-flood operation it was found by experimentation that, in order to obtain corrosion inhibition of the piping system used in this water flood, it would have been necessary to use a certain glyoxalidine in a concentration of about 0.05%. However, since the rate of water injection in this flood was equal to roughly 15,000 bbls. per day (i.e., nearly seven and one-half million pounds of water per day), it would have been necessary to use nearly 3750 pounds (or nearly two tons) per day of this corrosion inhibitor to effect a substantially complete protection of the piping system. Obviously, this is wholly outside the realm of practical possibilities or economy.

It is therefore one of the main objects of the present invention to obviate the above and other defects and disadvantages of the prior art, and to provide an economical method or technique for inhibiting corrosion (including pitting) of piping systems employed in water flood operations. It is another object of the invention to provide a composition or rather a combination of compounds which, when added in reasonably economical concentrations to the flood waters used in water flood operations, will inhibit and even completely prevent any corrosion, including pitting, of ferruginous pipes employed for the injection of said waters into an oil-bearing formation to be water-flooded, and of the pipes employed for the recovery of oil from such formations, and the transport of said waters from the recovery wells, through various separating, storing and treating units, back to the injection well or wells. Still further objects and advantages will appear as the specification proceeds.

It has been discovered that the above and other objects may be attained by having present in the flood waters, in combination, very small amounts each of a basic organic nitrogen compound and of sulfite ion. It has also been discovered that corrosion inhibition of piping systems used in oil field water flooding operations is effected by having very small amounts of sulfite ion and of a basic organic nitrogen compound present in the flooding waters, this corrosion inhibition being effective even when the quantity of said organic nitrogen compound in the flooding waters is so low that if present alone (i.e., in the absence of the sulfite ion), the amount of degree of corrosion occurring is even greater than when no corrosion-inhibiting basic organic nitrogen compound is present in the waters. It has been still further discovered that when sulfite ion is present in flood waters in very small amounts, between about 5 p.p.m. to about 150 p.p.m., substantially complete (if not absolutely complete) corrosion inhibition of piping systems used in water flood operations is effected even when the amount of the basic organic nitrogen compound employed therewith is present in the flood waters likewise in very small concentrations, from about 10 p.p.m. to about 100 p.p.m., i.e., of the order of 10% to 20% (or even less) of that normally necessary for the corrosion inhibition but for the presence of the sulfide ion. In this connection, and as it will be described, this total or substantially total corrosion inhibition occurs even when the amount of the basic organic nitrogen compound present is so low that, if present alone, i.e., in absence of the sulfite ion, there occurs corrosion to a degree markedly greater than if the flood waters were used in an untreated state, i.e., in the absence of any corrosion inhibitor.

The sulfite ion is one of the two compounds necessary for the corrosion inhibition of piping systems used for the water flooding (even under anaerobic conditions) of partially depleted oil fields. This sulfite ion may be formed in the flood waters by the addition thereto of any substance which, in contact with water, forms said sulfite ion. This may be done by injecting $SO_2$ into the water, or by adding thereto an alkali metal sulfite, which may be lithium sulfite, potassium sulfite, or sodium sulfite, the latter being preferred.

The invention may be stated to reside also in a process of inhibiting or even completely suppressing corrosion (including pitting) of the ferruginous walls of pipes, tubing, and the like, employed in connection with secondary recovery of oil from oil-bearing formations in which water is employed (under aerobic or anaerobic conditions) to flood the formation and displace the oil toward and into one or more recovery wells, this corrosion inhibition being effected by the incorporation into the flood waters of small amounts of a basic organic nitrogen compound having at least one aliphatic group of at least six carbon atoms in chain length and of the sulfite ion, which may be formed in the water by addition thereto of sulfur dioxide or of an alkali metal sulfite, which may be lithium sulfite, potassium sulfite, or sodium sulfite, the latter being preferred. As will be brought out below, the total amount of these two additives, i.e., basic organic nitrogen compound, and the sodium sulfite, necessary to produce substantially complete corrosion inhibition, including elimination of pitting, is materially smaller than the amount of the nitrogen compound necessary to effect corrosion inhibition, if this additive is used alone. In fact, the total concentration of both of these additives necessary to effect this corrosion prevention is somewhat in the order of about one-tenth of that necessary if the organic nitrogen compound is used alone. The same is true if the sulfite ion is used without the said nitrogen compound.

Generally speaking, the organic nitrogen compound (when used together with the sulfite ion) need not be present in amounts greater than about 50 p.p.m. based on the water to be treated, highly satisfactory results being obtainable with concentrations of this basic nitrogen compound between about 30 p.p.m. and about 40 p.p.m.; in many cases the use of even 20 p.p.m. of the nitrogen compound will be found to produce corrosion inhibition when used together with the aforesaid sulfite. In some cases, however, this additive might have to be present in concentrations as high as about 100 p.p.m.

As mentioned, sulfite ion is the other compound or ingredient which has to be present in the flood waters to effect the desired corrosion inhibition. Also, it was pointed out that the best and simplest way of having this sulfite ion present is by adding sodium sulfite to the water used in the flooding operations. Although the concentration of the sulfite ion in the flood waters may vary, it need never be more than ten times the concentrations of the oxygen dissolved in said water. Thus, although the concentration of the sulfite ion in the flood waters may be as high as 100 or even 150 p.p.m., when calculated as sodium sulfite based on the water, at least when flooding operations are conducted in a closed system and under anaerobic conditions, this concentration of sodium sulfite may be as low as 5 or 10 p.p.m. based on the water; the preferred range in the case of usual brine (i.e., formation waters) employed is between about 10 and about 50 p.p.m. or slightly higher.

As stated, the combined presence of the basic organic nitrogen compound and of the sulfite ion in the flood waters within the range of concentrations mentioned above is usually, and under most conditions sufficient to effect the desired complete, or at least substantially complete corrosion inhibition of piping systems used for water flooding of partially depleted hydrocarbon-containing formations to effect further recovery of hydrocarbons therefrom. However, it has been found that in some cases, particularly when relatively pure water is used as the flood water, it is highly desirable, and even necessary, to catalyze the activity of the sulfite ion. In the case of most flood waters, which as mentioned above, are usually brine waters from producing wells, they normally already contain this catalyst in solution, it being noted that, as will be pointed out below, the concentration of said catalyst in the waters need not be more than 1 p.p.m. It was found that the activity of the sulfite ion (in the combination described herein) is activated or catalyzed by such ions as ferric, ferrous, manganic, manganous, although the cobalt ions appear to give the best results. Therefore, when the waters do not contain any or sufficient catalyst, it is generally advantageous (in order to catalyze the activity of the sulfite ion) to use a cobalt compound, particularly cobaltic nitrate or cobaltic chloride. This catalyst, as stated, is generally employed in an exceedingly small concentration. Thus, it may vary from 1 p.p.b. to not more than 1 p.p.m., a satisfactory concentration in most cases being in the range of several parts per billion, e.g., less than about 10 or 20 p.p.b. As indicated, this catalyst apparently operates merely as an accelerator. It is therefore theoretically possible to inhibit corrosion (including pitting) by using the aforementioned quantities of said basic organic nitrogen compound and of sulfite ion even in relatively pure water if there was sufficient contact time. However, under normal flooding operations the use of the above two agents without the catalyst does not prevent pitting even if the amount or concentration of the sulfite ion in the flood waters is materially increased. Therefore, unless the water used already has a sufficient concentration of the sulfite-activating catalyst mentioned above, it appears that this inhibition of pitting requires time, and that, in order to avoid this, it is necessary to add the small amount of the catalyst, i.e., cobalt compound.

While any basic organic nitrogen compound having at least one aliphatic group of at least six carbon atoms in chain length may be used in combination with the activated or catalyst alkali metal sulfite, it is preferred to use one or more of certain groups of these nitrogen compounds of the following types: alkyl-substituted aliphatic monoamines, alkyl-substituted alkylene polyamines, quaternary ammonium compounds, glyoxalidines, and their salts.

As indicated, the above compounds should contain at least one aliphatic group of at least six carbon atoms in chain length. The alkyl group will generally contain from 8 to 20 carbon atoms, preferably 12–20 carbon atoms, and in a most preferred embodiment 12–16 carbon atoms.

In the case of the alkyl-substituted alkylene polyamines the alkyl group will be of from 8 to 18 carbon atoms in chain length. The compounds described above should be soluble in water at the use concentration dosages at which they are to be employed. Although this water solubility is desired, the products are of such a nature that they may be dispersed in the aqueous media in which they are to be incorporated; such is usually sufficient.

Primary, secondary and tertiary aliphatic monoamines may be used, this class being exemplified by octylamine, monylamine, decylamine, dodecylamine, octadecylamine, octodecyl dimethylamine, etc. There is a number of these relatively high molecular weight aliphatic amines which are commercially sold by various firms. For instance, Armour Chemical Company sells certain amines of this class under the tradename of Armeens. These amines contain as their alkyl radical mixed alkyl groups derived from natural oils and fats. Typical amines of this class are coco amines, tallow amine, soya amine, and hydrogenated fatty acid amines. A preferred subgroup is the acid, e.g., acetate, salts of these aliphatic monoamines.

Alkyl-substituted alkylene polyamines are described in Kyrides—U.S. 2,246,524, the disclosure of which is incorporated hereinto by reference. Typical compounds within the scope of this class are dodecyl diethylene triamine, n-hexadecyl triethylene tetramine and decyltetradecyl diethylene triamine. Also included in class are the N-alkyl-substituted trimethylene diamines sold by Armour Chemical Company under the tradename Duomeens, examples of which are N-cocotrimethylene diamine, and N-tallow trimethylene diamine. A preferred subgroup is the acid, e.g., adipate, salts of these alkylene polyamines.

A wide variety of quaternary ammonium compounds which are generally known to the art may be used in the water treating compositions of the present invention. The general class of these quaternary ammonium compounds may be illustrated by the formula

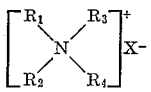

wherein at least one of the radicals $R_1$, $R_2$, $R_3$ and $R_4$ attached to the nitrogen atom is an alkyl radical having at least 6 carbon atoms in the chain, and preferably between 6 and 26 carbon atoms therein. The remaining radicals on the nitrogen atoms are substituents of hydrocarbon structure which may have less carbon atoms, e.g. a total of no more than 12 carbon atoms. The radical X in the above formula may be any salt-forming anionic radical. Illustrative of such quaternary compounds are the alkyl and alkaryl ammonium halides, e.g., cetyl trimethyl ammonium bromide, octadecyl trimethyl ammonium bromide, octadecylene dimethyl ethyl ammonium chloride, dimethyl dioctadecyl ammonium chloride, dimethyl dioctadecyl ammonium bromide, octadecyl dimethylbenzyl ammonium bromide, lauryl dimethyl ammonium bromide, and the like. Another type is the N-alkylpyridinium halides, e.g., N-laurylpyridinium bromide.

The glyoxalidines, which are heterocyclic nitrogen compounds containing two non-adjacent nitrogen compounds in a five-membered ring. This is described in U.S. Patent 2,668,100, which is incorporated hereby by reference. Illustrative examples of glyoxalidines, which may be used as such in the process of this invention, or in the form of its salicylic acid salts (the making of which is taught in the last-mentioned patent) are disclosed in column 2, lines 41 et seq. of the Luvisi patent—U.S. 2,668,100, which disclosure is likewise incorporated herein by reference.

Any method may be used for dissolving or dispersing the above or other basic organic nitrogen compounds, as well as the sulfur dioxide or alkali metal sulfites, in the flood waters, the particular method of introduction into the flood waters not being critical nor being a part of the present invention.

In order to test the new inhibitor combination, and to compare its effectiveness with presently commercially available inhibitors, a testing procedure was set up designed to duplicate as closely as possible in the laboratory the corrosion (including pitting) conditions existing in pipes used in water flood operations. In this testing procedure about 800 ml. of brine water, as employed in commercial water flood operations (which water contained less than 1 p.p.m. dissolved oxygen) is placed in a quart bottle and maintained at ambient temperature (about 70° F.). A rod (passing through a rubber stopper) carries a ferrous strip which is about ⅛ in. wide, about 2¾ in. long, and about 4 mls. thick. The water is maintained in agitation by means of electro-magnetic stirrer. The degree of corrosion is determined by measuring the electrical resistance, which increases as the specimen corrodes and becomes thinner. In order to determine not only overall corrosion, but also the effect of dissolved oxygen on localized pitting, etc., each strip had a rubber band tied around its middle. Also, in order to further simulate field conditions, the samples were transferred anaerobically.

A number of the above tests were run. Thus in one, 40 p.p.m. of a 50% conc. of N-cocotrimethylene diamine adipate was added to the brine together with 40 p.p.m. of sodium sulfite and an activating amount (about 1–2 p.p.b.) of cobaltic chloride. After several days, the strip was found to be substantially free from any corrosion, and no local pitting or corrosion effects were noted even under the rubber band. On the other hand, considerable corrosion was found after the same period of treatment when only the N-cocotrimethylene diamine adipate was used even in a concentration greater than 40 p.p.m. Likewise, when the above nitrogen containing compound was eliminated and only 40 p.p.m. of the sodium sulfite (together with the cobaltic chloride) were added to the brine water, general corrosion of the strip was noted within a relatively short period of time.

In still another test, 40 p.p.m. of the acetate salt of cocomonoamine were added to the brine. In this test the strip broke overnight right at the rubber band, thus clearly indicating that this nitrogen compound does not inhibit at least the localized effects caused by the presence of even the small amounts of dissolved air in the brine. On the other hand, the use of 40 p.p.m. of this monoamine acetate and of 40 p.p.m. of sodium sulfite (plus a few p.p.m. of cobaltic chloride) completely inhibited pitting, and there was very little, if any, general corrosion of the probe strip.

In still another test, 40 p.p.m. of a water-soluble substituted imidazoline, manufactured by Tretolite Company and sold under its trade-name Kontol 141, were added to a brine water, used for testing corrosion of a ferrous strip, immersed thereinto and maintained therein as described above. At the end of about 40 hrs., it was found that approximately 250 microinches of corrosion occurred. Thereupon, 100 p.p.m. of sodium sulfite was anaerobically injected through the stopper. This stopped completely any further corrosion, the degree of corrosion of the strip at the end of about 135 hours of test being the same as that before the injection of the sulfite.

A still further series of tests proved the unexpected advantage and superiority of using the combination of a basic organic nitrogen compound and of a sulfite. The first of these tests was made using uninhibited brine water from a producing well. When the strip was kept in this water under the conditions described further above, it was found that, at the end of 24 hours, the corrosion was equal to about 28 microinches. The next test was identical with the preceding one, except for the fact that 50 p.p.m. of a water-soluble substituted imidazoline were first added to the brine water. In this case, at the end of 24 hours, the corrosion was on the order of 370 microinches, and the test strip corroded through after 40 hours of immersion in the "inhibited" water. The presence of 80 p.p.m. of sodium sulfite in the brine water resulted in some inhibition: the corrosion of the strip was equal to about 15 microinches after about 48 hours. On the other hand, when 10 p.p.m. of the above substituted imidazoline were used together with the sodium sulfite, there was absolutely no corrosion loss even at the end of 80 hours.

When 40 p.p.m. of a quaternary ammonium compound were added, together with 20 p.p.m. of sodium sulfite and about ½ p.p.m. of cobaltic chloride, to brine waters used (in a closed system) for secondary oil recovery, by the so-called water flood technique, in a partially exhausted oil field in Illinois, it was found that these additives inhibited, and even prevented all corrosion including pitting of the piping system. Likewise, the use of a substituted imidazoline (in a concentration of 40 p.p.m.) together with 20 p.p.m. of sodium sulfite and ½ p.p.m. of cobaltic chloride in flood waters in another partially exhausted field also completely inhibited corrosion of all pipes and tanks used for the flood operations.

In order to further show the unexpected performance of the combination of additives constituting the present invention, four tests were made using the following conditions: In each, 450 ml. of brine water from a producing well were introduced into a stopped pint bottle. The brine was transferred anaerobically. A sand blasted mild steel strip 3¾ in. long, ⅛ in. wide and 0.004 inch thick was disposed in the bottle, a rubber band being tightly tied around the middle of each specimen. In each case the water was maintained in agitation and at room temperature. All of the tests were continued for 19 hours. The first test was a control, while the other three respectively contained 100 p.p.m. sodium sulfite, 20 p.p.m. of an oil-soluble substituted imidazoline alone, and with 100 p.p.m. of sodium sulfite. The following table shows the corrosion, both as weight loss and pitting, which occurred in each test:

| Amount of Imidazoline, p.p.m. | Amount of Na₂SO₃, p.p.m. | Corrosion Rate, Mils per Year | |
|---|---|---|---|
| | | Weight Loss | Pit Depth |
| None | None | 23 | 40 |
| None | 100 | 20 | About 10 |
| 20 | None | 19 | 700 |
| 20 | 100 | 1 | None |

We claim as our invention:

1. In the method for the secondary oil recovery wherein flooding water is injected through ferruginous pipes into an oil-bearing formation to displace a portion of the residual oil therein toward a producing well, the improvement comprising having present in said injected flooding water, to prevent corrosion of said ferruginous pipes, between about 10 and about 100 p.p.m., based on the flooding water, of a basic organic nitrogen compound having at least one aliphatic group of at least 6 carbon atoms in chain length, and between about 10 p.p.m. and about 150 p.p.m., of sulfite ion, when calculated as sodium sulfite based on the flooding water.

2. The method of secondary oil recovery wherein flooding water is injected under preessure through ferruginous pipes into an oil-bearing formation to displace a portion of the residual oil therein toward a producing well, the improvement which comprises conveying flooding waters through said ferruginous pipes and into the oil-bearing formation under anaerobic conditions, and maintaining in said injected flooding water, to prevent corrosion, including pitting, of said ferruginous pipes, between about 10 and about 100 p.p.pm., based on the flooding water, of a basic organic nitrogen compound having at least one aliphatic group of at least 6 carbon atoms in chain length and between about 5 p.p.m. and about 150 p.p.m., based on the flooding water, of an alkali metal sulfite.

3. The method according to claim 2 wherein the sulfite is catalyzed by the addition of a small effective amount, less than about 1 p.p.m., based on the flooding water, of a cobalt compound.

4. In the method of secondary oil recovery wherein flooding water is injected under pressure through ferrous pipes into an oil-bearing formation to displace a portion of the residual oil therein toward a producing well, the improvement which comprises effecting said water conveyance through the pipes and the formation under anaerobic conditions and having present in said injected flooding water, to prevent corrosion of said ferrous pipes, between about 10 and about 50 p.p.m. of a basic organic nitrogen compound selected from the group consisting of alkyl-substituted aliphatic monoamines, alkyl-substituted alkylene polyamines, glyoxalidines, and their quaternary ammonium and acid salts, said compounds having at least one aliphatic group of at least 8 carbon atoms in chain length, and between about 10 and about 30 p.p.m. of an alkali metal sulfite, said concentrations being based on the quantity of the flooding water.

5. The method according to claim 4 wherein the alkali metal sulfite is sodium sulfite.

6. The method according to claim 4 wherein the alkali metal sulfite is catalyzed by the presence of a small effective amount, less than about 1 p.p.m., of a cobalt compound selected from the group consisting of cobaltic nitrate and cobaltic chloride.

7. In the method of secondary oil recovery wherein flooding water is injected under pressure through ferrous pipes into an oil-bearing formation to displace a portion of the residual oil therein toward a producing well, the improvement which comprises having present in said injected flooding water, for the purpose of preventing corrosion of said ferrous pipes, between about 10 and about 50 p.p.m. of an acid salt of an aliphatic monoamine having an alkyl radical of at least 8 carbon atoms, between about 10 p.p.m. and about 30 p.p.m. of sodium sulfite, said concentrations being based on the flooding water.

8. The method according to claim 7 wherein the acid salt of the aliphatic monoamine is the acetate salt of cocomonoamine, which is present in the flooding water in a concentration of between about 10 and about 20 p.p.m. based on the flooding water.

9. In the method of secondary oil recovery wherein flooding water is injected under pressure through ferrous pipes into an oil-bearing formation to displace a portion of the residual oil therein toward a producing well, the improvement which comprises having present in said injected flooding water, for the purpose of preventing corrosion of said ferrous pipes, between about 10 and about 50 p.p.m. of an acid salt of an alkyl-substituted alkylene polyamine having an alkyl radical of at least 8 carbon atoms, between about 10 p.p.m. and about 30 p.p.m. of sodium sulfite, and a small effective amount, less than about 20 p.p.b., of a cobalt compound from the group consisting of cobaltic nitrate and cobaltic chloride, all of said concentrations being based on the flooding water.

10. The method according to claim 9 wherein the acid salt of the alkyl-substituted alkylene polyamine is the adipic acid salt of N-cocotrimethylene diamine.

References Cited in the file of this patent

UNITED STATES PATENTS

| 2,152,779 | Wagner et al. | Apr. 4, 1939 |
| 2,738,325 | Rydell | Mar. 13, 1956 |
| 2,818,383 | Jolly | Dec. 31, 1957 |
| 2,901,439 | Burke | Aug. 25, 1959 |
| 2,926,108 | Andersen | Feb. 23, 1960 |